United States Patent Office 3,497,509
Patented Feb. 24, 1970

3,497,509
IMINO ESTER METHOD FOR PRODUCING 1,4,
5,6-TETRAHYDRO-as-TRIAZINE
Donald L. Trepanier, Indianapolis, Ind., assignor to The Dow Chemical Company, Midland, Mich., a corporation of Delaware
No Drawing. Filed Dec. 5, 1966, Ser. No. 598,894
Int. Cl. C07c 55/10; A61k 27/00
U.S. Cl. 260—248                                   4 Claims

ABSTRACT OF THE DISCLOSURE 1,4,5,6-tetrahydro-as-triazines such as 3-(2,6-dichlorobenzyl) - 1,5 - dimethyl - 1,4,5,6 - tetrahydro - as-triazine are prepared by a process in which a β-aminoalkyl hydrazine, such as 1-methyl-1-(β-aminopropyl)hydrazine, is reacted with an imino ester hydrochloride, such as ethyl 2,6-dichlorophenyl-acetimidate hydrochloride. The 1,4,5,6-tetrahydro-as-triazines have pharmacological activity and, in particular, central nervous system activity.

The present invention is directed to a new method for producing a group of new 1,4,5,6-tetrahydro-as-triazine compounds. The 1,4,5,6-tetrahydro-as-triazines produced by the new method correspond to the formula

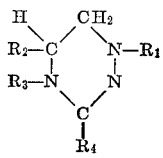

In the formulas to be found in the present specification and claims, $R_1$ represents methyl or hydrogen, $R_2$ independently represents methyl or hydrogen, $R_3$ independently represents hydrogen, methyl or ethyl, and $R_4$ independently represents ethyl, phenyl, substituted phenyl, substituted benzyl, pyridyl and halophenoxymethyl. The term "halo" as employed in the present invention represents chloro, bromo, fluoro or iodo, the term "substituted phenyl" refers to mono- and polyhalophenyl, mono- and polymethylphenyl, mono- and polymethoxyphenyl, the term "substituted benzyl" refers to mono- and polyhalobenzyl, mono- and polymethylbenzyl and mono- and polymethoxybenzyl and the term "halophenoxymethyl" refers to mono- and polyhalophenoxymethyl. Representative $R_4$ moieties include ethyl, 4-fluorophenyl, 2-chlorophenyl, 3-bromophenyl, 4-iodophenyl, 2,3,4,5,6-pentachlorophenyl, 2,3,4,5-tetrachlorophenyl, 3,4,5-tribromophenyl, 3,5-dibromophenyl, 3.5-dichlorophenyl, 2,4,6-trichlorophenyl, 2,6-dibromophenyl, 2,3,6-tribromophenyl, 2,3,6-tribromobenzyl, 2,4,6-trichlorobenzyl, 2,4-dichlorophenyl, 2,4,-dichlorobenzyl, 4-bromobenzyl, 3-chlorobenzyl, 2-chlorobenzyl, 4-methylphenyl, 3-methylphenyl, 2,4-dimethylphenyl, 2,4,6-trimethylphenyl, 2-methylbenzyl, 3-methylbenzyl, 2,3,5-trimethylbenzyl, 2,4,6-trimethylbenzyl, 4-methoxyphenyl, 3-methoxyphenyl, 3,5-dimethoxyphenyl, 2,4-dimethoxyphenyl, 2,3,5-trimethoxyphenyl, 4-methoxybenzyl, 2-methoxybenzyl, 2,3,5-trimethoxybenzyl, 2,4-dimethoxybenzyl, 3,5-dimethoxybenzyl, 3,4,5-trimethoxybenzyl, 4-chlorophenoxymethyl, 4-bromophenoxymethyl, 3,4-dichlorophenoxymethyl, 3,4,5-trichlorophenoxymethyl, 2,4,6 - trichlorophenoxymethyl, 2,4,5 - tribromophenoxymethyl, 2,3,4,5 - tetrachlorophenoxymethyl, 3,4-dibromophenoxymethyl and the like. These new compounds have been found to be pharmacologically active and to affect the central nervous system of higher animals and are claimed in a copending application Ser. No. 598,977, now Patent No. 3,428,635 filed concurrently herewith by Trepanier and Harris.

The new 1,4,5,6-tetrahydro-as-triazine compounds are prepared by the new method of the present invention which comprises reacting an α-aminoalkyl hydrazine corresponding to the formula

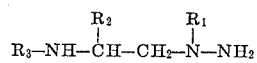

with a methyl or ethyl imino ester hydrochloride corresponding to the formula

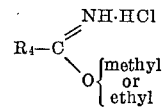

The reaction is conveniently carried out in an inert organic solvent as reaction medium and in glass, glass-lined or corrosion-resistant equipment.

The slightly exothermic reaction proceeds readily at temperatures from about 50° to about 200° C. In a convenient procedure, the reaction is carried out at the boiling temperature of the reaction mixture at or about normal atmospheric pressure and under reflux. The reaction proceeds readily with production of the desired product when the reactants are contacted at the reaction temperature in any proportions, however, optimum yields of the 1,4,5,6-tetrahydro-as-triazine products are obtained when the β-aminoalkylhydrazine and imino ester salt are employed in substantially equimolar proportions.

In carrying out the new process of the present invention, the β-aminoalkylhydrazine and imino ester salt are contacted, intimately in any fashion. In a convenient procedure, the reactants are contacted in an inert organic liquid as reaction medium. Representative inert organic liquids to be employed as reaction media include ethanol, chloroform and methanol. The temperature of the reaction mixture is maintained at a temperature within the desired reaction temperature range for a short period of time to complete the reaction. Thereafter, the reaction mixture is fractionally distilled to remove the low boiling constituents and obtain the crude product as a residue. The residue thus obtained is dispersed in water and the resulting aqueous mixture made acidic by the addition of a mineral acid such as hydrogen chloride, hydrogen bromide, sulfuric acid or the like. The acidic aqueous mixture thus prepared is then extracted with chloroform or methylene chloride to remove from the acidic aqueous mixture any non-basic reaction by-products which may have formed during the reaction. The chloroform or methylene chloride extraction fraction is then separated from the acidic aqueous fraction and the acidic aqueous fraction processed further to isolate the tetrahydro-as-triazine product. In such an isolation procedure, the acidic aqueous fraction is made basic by mixing it with a solution of an alkali metal base. Representative alkali metal bases include sodium hydroxide, potassium hydroxide, sodium carbonate and the like. The basic aqueous mixture thus prepared is extracted with an organic solvent such as methylene chloride, diethyl ether, benzene, toluene or chloroform to extract the desired product from the aqueous phase. The solution of 1,4,5,6-tetrahydro-as-triazine in the extraction solvent is thereafter washed with water, dried and the low boiling constituents evaporated to obtain the product as a residue. This residue can be crystallized with an appropriate solvent to obtain the 1,4-5,6-tetrahydro-as-triazine product as a crystalline solid or fractionally distilled to obtain the product as a liquid distillation fraction.

The following examples are merely illustrative and are not intended to be limiting.

EXAMPLE 1

3-(3,4,5-trimethoxyphenyl)-1-methyl-1,4,5,6-tetrahydro-as-triazine

Ethyl 3,4,5 - trimethoxybenzimidate hydrochloride (16 grams; 0.058 mole) was dissolved in 200 milliliters of absolute ethanol. To this solution was added 1-β-aminoethyl-1-methyl hydrazine (5.2 grams; 0.058 mole). The resulting mixture was heated at the boiling temperature and under reflux for 21 hours. Following the reflux period, the reaction mixture was concentrated, dissolved in 200 milliliters of 5 percent hydrochloric acid and extracted with chloroform. The acidic aqueous phase was then made basic (pH 12) by the addition of a cold aqueous sodium hydroxide solution and the basic solution extracted with chloroform. This chloroform extract was then concentrated by evaporation to obtain a viscous liquid. The latter was then dissolved in ethyl acetate and the ethyl acetate evaporated from the solution until crystals began to form whereupon the crystal-containing mixture was cooled to enhance crystallization. The crystals thus formed were separated by filtration and twice recrystallized from ethyl acetate to obtain the 3-(3,4,5-trimethoxyphenyl)-1-methyl-1,4,5,6-tetrahydro-as-triazine product as a crystalline solid melting at 115.9°–116.5° C.

EXAMPLE 2

3-(2,6-dichlorobenzyl)-1,5-dimethyl-1,4,5,6-tetrahydro-as-triazine

Ethyl 2,6 - dichlorophenyl - acetimidate hydrochloride (21.5 grams; 0.085 mole) was dissolved in 200 milliliters of warm absolute ethanol. To this solution was added 1-methyl-1-(β-aminopropyl)hydrazine (8.8 grams; 0.085 mole) and the resulting mixture heated at the boiling temperature and under reflux for 20 hours. Following the reflux period the reaction mixture was concentrated nearly to dryness by evaporating the low boiling constituents at a temperature of about 60° C. The remaining residue was dissolved in 5 percent hydrochloric acid whereupon the reaction mixture separated into two phases. The acidic aqueous phase was washed with chloroform and made basic (pH 11) by the addition of aqueous sodium hydroxide solution. During the adjustment of the pH, a solid material precipitated in the reaction mixture. This precipitated solid material was separated from the reaction mixture by filtration and the filtered solid washed with chloroform. The chloroform wash liquid was then concentrated to dryness to obtain a crystalline solid residue. This crystalline solid residue was recrystallized from carbon tetrachloride and then from ethyl acetate. The crystalline solid 3-(2,6-dichlorobenzyl)-1,5-dimethyl-1,4,5,6-tetrahydro-as-triazine product recrystallized from the ethyl acetate was dried over $P_2O_5$ and found to melt at 158.5–159.1° C.

EXAMPLE 3

In further operations, a β-aminoethylhydrazine is dissolved in 50 milliliters of a suitable solvent. The solution thus formed is added portionwise with stirring over a period of about one half hour to a solution of one of the various ethyl iminoester hydrochlorides in about 250 milliliters of one of the solvents previously enumerated. The mixture is stirred and refluxed for about 6 hours, concentrated in vacuo, cooled, diluted with about 150 milliliters of ice water, the aqueous mixture acidified to approximately pH 2 with hydrochloric acid, and the acidic aqueous mixture washed twice with 150-milliliter portions of methylene chloride. The washed acidic aqueous solution is made strongly basic with a cold aqueous sodium hydroxide solution and extracted with chloroform. The chloroform extract is then washed with water and dried over magnesium sulfate. The washed and dried chloroform extract is then evaporated in vacuo to obtain a solid or oily residue which is purified by distillation or crystallization. In this manner, the following compounds are prepared.

1 - methyl-3-phenyl-1,4,5,6-tetrahydro-as-triazine, melting point 88°–89° C., by reacting together methyl benzimidate hydrochloride and 1-(2-aminoethyl)-1-methylhydrazine in chloroform.

1-methyl - 3 - (2,3,6-trichlorobenzyl)-1,4,5,6-tetrahydro-as-triazine, melting point 167°–168° C., by reacting together ethyl 2,3,6-trichlorophenylacetimidate hydrochloride and 1 - (β-aminoethyl) - 1 - methylhydrazine in ethanol.

1,5-dimethyl - 3 - (2,3,6-trichlorobenzyl)-1,4,5,6-tetrahydro-as-triazine, melting point 161°–163° C., by reacting together ethyl 2,3,6-trichlorophenylacetimidate hydrochloride and 1-(2-aminopropyl)-1-methylhydrazine in ethanol.

3 - (2,6 - dichlorobenzyl)-1,4,5,6-tetrahydro-as-triazine, melting point 159°–160° C., by reacting together ethyl 2,6-dichlorophenylacetimidate hydrochloride and 2-aminoethylhydrazine in ethanol.

1 - methyl - 3 - (2,6-dichlorobenzyl)-1,4,5,6-tetrahydro-as-triazine, melting point 128°–130° C., by reacting together ethyl 2,6-dichlorophenylacetimidate hydrochloride and 1-(2-aminoethyl)-1-methylhydrazine in ethanol.

1,5-dimethyl-3-phenyl - 1,4,5,6 - tetrahydro-as-triazine, boiling point 135°–137° C., under a pressure of 0.8 millimeter of mercury, by reacting together methyl benzimidate hydrochloride and 1-(2-aminopropyl)-1-methylhydrazine in chloroform.

1,5-dimethyl - 2 - (2,6-dichlorobenzyl)-1,4,5,6-tetrahydro-as-triazine, melting point 158°–159° C., by reacting together ethyl 2,6-dichlorophenylacetimidate hydrochloride and 1-(2-aminopropyl)-1-methyldrazine in ethanol.

3 - (3,4,5 - trimethoxyphenyl)-1,4,5,6-tetrahydro-as-triazine, melting point 132°–133° C., by reacting together ethyl 3,4,5 - trimethoxybenzimidate hydrochloride and 2-aminoethylhydrazine in ethanol.

3-methyl-1,4,5,6-tetrahydro-as-triazine, boiling at 82°–85° C., under a pressure of 0.12 millimeter of mercury, by reacting together ethyl acetimidate hydrochloride and 2-aminoethylhydrazine in chloroform.

1,3-dimethyl - 1,4,5,6 - tetrahydro-as-triazine, boiling at 73°–75° C., under a pressure of 0.5 millimeter of mercury, by reacting together ethyl acetimidate hydrochloride and 1-(2-aminoethyl)-1-methylhydrazine in ethanol.

1 - methyl-3-ethyl-1,4,5,6-tetrahydro-as-triazine, boiling at 80°–83° C., under a pressure of 0.7 millimeter of mercury, by reacting together ethyl propioimidate hydrochloride and 1 - (2-aminoethyl) - 1 - methylhydrazine in ethanol.

1,3,5-trimethyl-1,4,5,6 - tetrahydro - as - triazine, boiling at 74°–76° C. under a pressure of 0.7 millimeters of mercury, by reacting together ethyl acetimidate hydrochloride and 1-(2-aminopropyl)-1-methylhydrazine in ethanol.

3 - (4-chlorophenyl)-1,4,5,6-tetrahydro - as - triazine, melting point 136°–137° C., by reacting together ethyl 4-chlorobenzimidate hydrochloride and 2-aminoethyl hydrazine in ethanol.

1 - methyl-3-(4-chlorobenzyl)-1,4,5,6-tetrahydro - as - triazine, melting point 133°–134° C., by reacting together ethyl 4-chlorophenylacetimidate hydrochloride and 1-(2-aminoethyl)-1-methylhydrazine in ethanol.

1,5 - dimethyl-3-(3,4,5-trimethoxyphenyl) - 1,4,5,6 - tetrahydro-as-triazine, melting point 148°–149° C., by reacting together ethyl 3,4,5-trimethoxybenzimidate hydrochloride and 1-(2-aminopropyl)-1-methylhydrazine in ethanol.

1-methyl-3-phenyl - 4 - ethyl-1,4,5,6-tetrahydro - as - triazine, boiling at 118°–119° C. under a pressure of 0.2 millimeter of mercury, by reacting together ethyl benzimidate hydrochloride and 1 - (2 - ethylaminoethyl)-1-methylhydrazine in ethanol.

1 - methyl-3-(4-chlorobenzyl)-4-ethyl - 1,4,5,6 - tetrahydro-as-triazine, melting point 63°–64° C., by reacting together ethyl-4-chlorophenylacetimidate hydrochloride and 1-(2-ethylaminoethyl)-1-methylhydrazine in ethanol.

1 - methyl-3-(3,4-dichlorophenoxymethyl) - 1,4,5,6 - tetrahydro-as-triazine, melting point 83°–85° C., by reacting together ethyl 3,4-dichlorophenoxyacetimidate hydrochloride and 1-(aminoethyl)-1-methylhydrazine in ethanol.

3 - (3,4-dichlorophenoxymethyl)-1,4,5,6 - tetrahydro - as-triazine (molecular weight 230.08), by reacting together ethyl 3,4 - dichlorophenoxyacetimidate hydrochloride and 2-aminoethylhydrazine in ethanol.

1,5 - dimethyl-3-(3,4-dichlorophenoxymethyl) - 1,4,5,6-tetrahydro-as-triazine (molecular weight 276.31) by reacting together ethyl 3,4-dichlorophenoxyacetimidate hydrochloride and 1-(2-aminopropyl)-1-methylhydrazine in ethanol.

1-methyl - 3 - (4-pyridyl)-1,4,5,6-tetrahydro - as - triazine, melting point 117°–118° C., by reacting together ethyl isonicotinimidate hydrochloride and 1-(2-aminoethyl)-1-methylhydrazine in ethanol.

1 - methyl - 3 - (4-pyridyl)-4-ethyl-1,4,5,6-tetrahydro-as-triazine, boiling at 118° C. under a pressure of 0.12 millimeter of mercury, by reacting together ethyl isonicotinimidate hydrochloride and 1 - (2 - ethylaminoethyl)-1-methylhydrazine in ethanol.

1,4-dimethyl - 3 - (3,4-dimethoxybenzyl)-1,4,5,6-tetrahydro-as-triazine, melting point 152°–153° C., by reacting together ethyl 3,4-dimethoxyphenylacetimidate hydrochloride and 1-(2-methylaminoethyl)-1-methylhydrazine in ethanol.

1-methyl - 3 - (3,4-dimethylbenzyl)-1,4,5,6-tetrahydro-as-triazine, melting at 129°–132° C., by reacting ethyl 3,4-dimethylphenylacetimidate hydrochloride and 1-(2-aminoethyl)-1-methylhydrazine in ethanol.

3-(3,4-dimethoxybenzyl) - 1,4,5,6-tetrahydro - as - triazine, melting at 77°–79° C., by reacting together ethyl 3,4-dimethoxyphenylacetimidate hydrochloride and 2-amino-ethylhydrazine in ethanol.

The β-aminoalklhydrazines employed as starting materials in the present invention are prepared in accordance with known techniques. In such procedures hydrazine or methyl hydrazine corresponding to the formula $$R_1-NH-NH_2$$

is reacted with aziridine, propyleneimine or an N-alkyl-aziridine corresponding to the formula

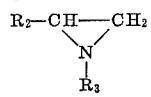

in the presence of a catalytic amount of ammonium chloride. The reaction mixture is heated at the boiling temperature and under reflux for about 24 hours. Thereafter the excess hydrazine is distilled off and the product separated by fractional distillation.

What is claimed is:
1. A process for producing a 1,4,5,6-tetrahydro-as-triazine corresponding to the formula

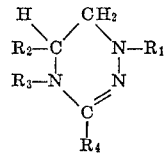

which comprises reacting a β-aminoalkylhydrazine corresponding to the formula

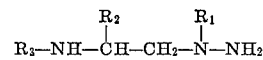

with an amino ester hydrochloride corresponding to the formula

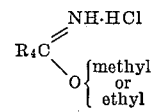

wherein, in the above formulae $R_1$ represents methyl or hydrogen, $R_2$ independently represents methyl or hydrogen, $R_3$ independently represents hydrogen, methyl or ethyl and $R_4$ independently represents ethyl, phenyl, pyridyl, monohalophenyl, monomethylphenyl, monomethoxyphenyl, monohalobenzyl, monomethylbenzyl, monomethoxybenzyl, monohalophenoxymethyl, 3,4-dichlorophenoxymethyl in which the term "halo" represents chloro, bromo, fluoro or iodo.

2. The process claimed in claim 1 wherein the β-aminoethylhydrazine and imino ester hydrochloride are reacted at a temperature of from 50° C. to 200° C. in the presence of an inert organic solvent as reaction medium.

3. The method claimed in claim 1 which comprises reacting ethyl 3,4-dichlorophenoxyacetimidate hydrochloride and 1-(amionethyl)-1-methylhydrazine.

4. The method claimed in claim 1 which comprises reacting ethyl 4-chlorophenylacetimidate hydrochloride and 1-(2-aminoethyl)-1-methylhydrazine.

References Cited

UNITED STATES PATENTS 2,817,682   12/1957   Ratz _____ 260—248 XR

OTHER REFERENCES

Trepanier et al., J. of Medicinal Chem., vol. 9, pp. 881–5 (1966).

HENRY R. JILES, Primary Examiner

J.M. FORD, Assistant Examiner

U.S. Cl. X.R.

260—583, 999